United States Patent [19]

Hein

[11] Patent Number: 4,860,634
[45] Date of Patent: Aug. 29, 1989

[54] ARRANGEMENT FOR CONTROLLING THE TRAVEL OF TWO HYDRAULIC CYLINDERS

[75] Inventor: Theo Hein, Lohr am Main, Fed. Rep. of Germany

[73] Assignee: Mannesmann Rexroth GmbH, Fed. Rep. of Germany

[21] Appl. No.: 229,926

[22] Filed: Aug. 8, 1988

[30] Foreign Application Priority Data

Aug. 10, 1987 [DE] Fed. Rep. of Germany ....... 3726605

[51] Int. Cl.$^4$ .............................. F15B 9/03; F15B 9/09
[52] U.S. Cl. .................................... 91/363 R; 91/459; 198/807; 242/57.1
[58] Field of Search ...................... 91/171, 1, 275, 361, 91/362, 363 R, 419, 459; 242/57.1; 198/807, 810; 318/615, 645

[56] References Cited

U.S. PATENT DOCUMENTS

| | | | |
|---|---|---|---|
| 2,914,957 | 12/1959 | Johnson | 198/807 X |
| 3,543,642 | 5/1969 | Seamone | 91/361 |
| 3,739,158 | 6/1973 | Woodward | 318/615 |
| 4,700,610 | 10/1987 | Bauer et al. | 91/390 |
| 4,712,470 | 12/1987 | Schmitz | 91/361 X |

FOREIGN PATENT DOCUMENTS

| | | |
|---|---|---|
| 2114835 | 3/1971 | Fed. Rep. of Germany . |
| 2137454 | 11/1971 | Fed. Rep. of Germany . |
| 2643679 | 10/1972 | Fed. Rep. of Germany . |
| 2610643 | 2/1976 | Fed. Rep. of Germany . |
| 2244809 | 11/1978 | Fed. Rep. of Germany . |

Primary Examiner—Robert E. Garrett
Assistant Examiner—Mark A. Williamson
Attorney, Agent, or Firm—Harness, Dickey & Pierce

[57] ABSTRACT

For setting and guiding a band running round two rolls the bearings of the roll on either side are each adjustable by a hydraulic or lifting cylinder. Each hydraulic cylinder comprises a position control circuit. The position desired value applied jointly to the position control circuits is varied by a tension-dependent control in such a manner that in the position adjustment a maximum admissible tension force is not exceeded. Furthermore, the position desired value has superimposed thereon a correction control by which the center setting of the band is monitored. The arrangement is preferably provided for positioning and tension-dependent adjustment of the encircling metal band of a sheet casting apparatus.

12 Claims, 1 Drawing Sheet

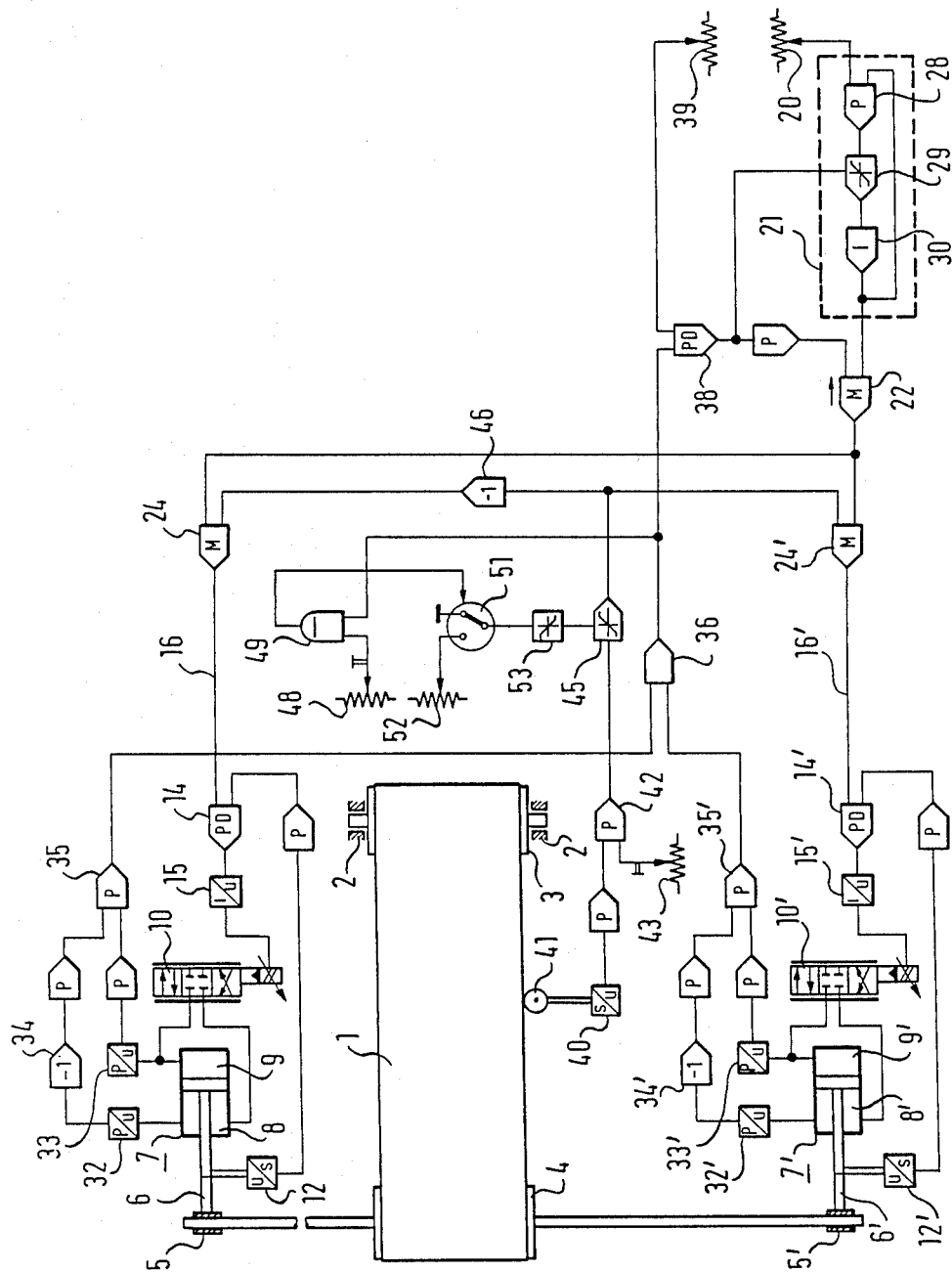

ARRANGEMENT FOR CONTROLLING THE TRAVEL OF TWO HYDRAULIC CYLINDERS

The invention relates to an arrangement for controlling the travel of two hydraulic cylinders according to the preamble of claim 1.

Position-controlled lifting or hydraulic cylinders have a great variety of uses. Thus, the tensioning roll of a revolving metal band may be involved which is adjusted on both sides by two hydraulic or lifting cylinders via servo valves in such a manner that a certain tensioning force of the metal band is achieved and in addition said band remains aligned centrally on the tensioning roll. An example of use is a sheet metal casting plant. In any case the positioning of the hydraulic cylinders must take place very accurately to fulfil the requirements of the roll setting.

An adjustment of other components, for example lifting platforms, platforms or bridge members, for which a corresponding positioning is necessary and on which possibly asymmetrical forces act, can however also be made by means of the hydraulic cylinders. The invention is therefore not restricted to a position control for said metal band.

The invention proceeds from known position control arrangements in which a desired value and an actual value for the travel measured at a hydraulic cylinder are supplied to a controller which generates an error quantity which via a suitable driver stage drives a proportional directional control valve which is provided for actuating the hydraulic cylinder.

The problem underlying the invention resides in further developing the control arrangement so that in simple manner a high position accuracy is achieved, particularly when the component to be adjusted is also subjected to dynamic forces which require corresponding corrections of the positioning.

Said problem is solved according to the invention by the features set forth in the characterizing clause of claim 1.

Advantageous further developments of the invention are characterized in the subsidiary claims.

Thus, a separate positioning control circuit of which the same desired value is supplied is provided for each hydraulic cylinder. This furnishes a basic setting for the hydraulic cylinders which must be corrected in dependence upon the forces acting on the component to obtain a correspondingly accurate positioning.

For example, the correction value can be determined by means of a displacement pickup, the roller of which senses the lateral edge of the tensioning band. As a result all the forces acting on the tensioning band or tensioning roll and leading to a wandering of the metal band can be detected. Deviations from the desired central position of the edge are supplied in the positive and negative sense to the respective position control circuit of the hydraulic cylinders so that the position of the hydraulic cylinders is corrected in opposite senses until the middle value for the edge is reached.

In addition, it may be necessary not to exceed specific given adjusting forces. For example, a predetermined tensioning force for the metal band or a band tension control must not be exceeded. Consequently, according to the invention a force-dependent control is superimposed on the position control circuit. The adjusting, opposing force exerted by the actuating or hydraulic cylinders is compared in a controller with a predetermined value. If the adjusting force exceeds the predetermined value the force control intervenes in the desired value generation for the positioning and reduces the desired value so that the hydraulic cylinders are moved back accordingly.

Under dynamic conditions, i.e. if in the adjustment alternating forces occur, according to a further development of the invention a sliding desired value is provided for the position control arrangements. Accordingly, the desired value for the position is set so high that normally it cannot be reached because otherwise the present adjusting force would be exceeded. The desired value is supplied via a ramp forming stage to the position control circuits, i.e. the rise to the predetermined desired value is flatter or steeper depending on the setting of the ramp former. If the preset adjusting force is exceeded hereby the rising ramp for the position desired value is flattened and in addition the desired value supplied to the position control circuits reduced. If in this control operation the admissible value for the adjusting force is again reached then firstly the desired value signal supplied to the position control circuits is increased again and in addition the rising ramp of the desired value signal increased. In this manner the adjusting force or the tensioning force of the metal band is held in narrow limits in an admissible range on occurrence of dynamic forces by varying the desired value set in height and steepness of its rise in accordance with the force.

The arrangement according to the invention further has the following advantage: on response of the correction circuit by which the desired value for the positioning of the one hydraulic cylinder is increased and for the other hydraulic cylinder decreased and in this operation the adjusting force control intervenes, i.e. for example the maximum admissible tensioning force has been exceeded, then the desired value supplied to the position control circuits is changed so that both hydraulic cylinders are reset in such a relationship to each other that the center correction is retained. The hydraulic cylinder set in any case to return then receives an increased desired value so that its return movement is accelerated whilst the other hydraulic cylinder is reversed in its direction of rotation.

An example of embodiment of the invention will be explained hereinafter with the aid of the drawings in which a control arrangement for the tensioning roll of a band running round a pair of rollers is illustrated.

A metal band 1 runs round a roll 3 which is mounted in bearings 2 fixed with respect to the housing and is driven by a drive which is not illustrated. A tensioning roll 4 is mounted on both sides in bearings 5 and 5', the bearings having the same distance from the roll center. The bearings are secured to piston rods 6 and 6' of double-action hydraulic cylinders 7, 7' having piston chambers 8 and 9, 8' and 9' respectively which are connectable via a proportional directional control valve 10 and 10' respectively to a fluid source, not illustrated, or a tank T.

Associated with each hydraulic cylinder 7, 7' is a position control circuit which consists of a displacement pickup 12, 12' measuring the position of the piston rod 6, 6', a PD controller 14, 14' and a driver stage 15, 15' for driving the valve 10, 10'. The matching members of the circuit arrangement denoted by P are not described in detail. Thus, the actual value for the position and a desired value via a line 16, 16' are supplied to the respective controller 14, 14'. The two values are combined in the controller and the positioning of the hydraulic cylinders 7, 7' effected in accordance with the error quantity generated by the controller.

The desired value for the positioning is set at a potentiometer 20 common to both position control circuits, passes through a ramp former 21 and a summation stage 22 and then reaches the respective first input of a summation stage 24 and 24' associated with each position control circuit.

When the desired value signal for the position changes the edge steepness of the change is adjustable by the ramp former 21. The ramp former 21 consists of an input stage 28 having a jump function, a limiter stage 29 and an integrating stage 30 as output. The input stage 28 comprises two inputs: the first input is subjected to the output signal of the integrating stage 30 and the second input receives the position desired value.

On measuring the adjusting force exerted by the hydraulic cylinders 7, 7' or the tensioning force acting on the band 1 pressure pickups 32, 33 and 32', 33' are provided which measure the pressure in the two cylinder chambers 8, 9 and 8', 9' of the hydraulic cylinders. The pressure measured value in the piston-rod-side cylinder chambers 8, 8' is inverted in 34 or 34' and subtracted in an adder stage 35 or 35' from the pressure value measured on the piston side. The two pressure values corresponding to the tension force exerted on the band 1 are added in the summation stage 36 and supplied to a first input of a PD controller 38 to the second input of which a signal is applied which is set at a potentiometer 39 and corresponds to the maximum admissible tensioning force. If the signal emitted by the summation stage 36 exceeds the voltage value set at the potentiometer 39 the controller 38 switches through and sends through an output signal which is led on the one hand to the second input of the summation stage 22 for the desired value and on the other to the limiter stage 29 of the ramp former. As a result a force-dependent control is superimposed on the position control circuits.

In addition a correction arrangement is provided which measures deviations from the predetermined center position of the band 1 and with said measured value corrects the desired value for the positioning. This arrangement consists of a displacement pickup 40 which is actuated by a roller 41 sensing the band edge. Said signal is supplied to a first input of a controller 42 to the second input of which a value set at a potentiometer 43 for the desired center position of the band 1 is applied. The controller 42 determines the deviation of the band edge from the center position. The error value is led via a limiter stage 45 firstly directly to the summation stage 24' of the one positioning control circuit and via the inverter 46 inverted to the summation stage 24 of the other position control circuit.

In addition a circuit is provided which when the system is started inhibits the output signal of the controller 42 for as long as the tensioning force exerted on the band 1 lies beneath a predetermined value which can be set at a potentiometer 48. In a comparison stage 49 this value is compared with the actual value at the output of the summation stage 36. If the value set at the potentiometer 48 is exceeded the comparison stage 49 furnishes an output voltage which switches over a switch 51, a limiting voltage from the potentiometer 52 thereby being switched via a limiter stage 53 to the limiter stage 45 connected to the output of the controller 42. The voltage switched from the stage 53 to the limited stage 45 results in the enabling of said limiter stage 45 and the signal present at the output of the controller 42 is increased in accordance with the rising output voltage of the limiter stage 53 via the limiter stage 45 until it corresponds to the end value generated by the controller 42. Consequently, the activation of the center correction on starting the system is not abrupt but gradual so that undesired adjustment movements of the hydraulic cylinders are avoided.

Via the center correction the desired value for the position supplied to the two summation stages 24, 24' is varied by adding or subtracting in such a manner that the desired value supplied to the position controllers 14, 14' results in adjustment movements of the hydraulic cylinders in the respective corresponding opposite direction to hold the band 1 in the center position. Attention must be paid to correct poling of the controller 42.

The mode of operation of the ramp former 21 together with the tension-dependent control is as follows: the desired value at the potentiometer is set to a value which leads to a tensioning force which is too great so that the controller 38 responds before this value is reached.

At the output of the ramp former 21 a signal is generated which rises in a ramp manner to the value set at the potentiometer 20. The rise angle can be varied by the ramp former 21 corresponding to the signal furnished by the controller 38. The output of the integrating stage 30 is led to the second input of the input stage 28 so that at the input stage the desired value set at the potentiometer 20 is present and the output of the ramp former. As long as these signals are different the input stage 28 switches through and furnishes a fixed voltage at its output. This fixed voltage is limited by the limiter stage 29 corresponding to the control voltage applied by the controller 38. As a result at the output of the limiter stage 29 a reduced output voltage appears which depends on the tensioning force and which is integrated in the following integrating stage 30. The smaller the voltage applied to the integrating stage 30 the flatter the rising edge of the desired value for the position. On the other hand, the greater the voltage supplied by the limiter stage 29 to the integrating stage 30 the steeper the rise angle for the position desired value. It is thus possible via the control voltage supplied to the limiter stage 29 to adjust the ramp steepness for the position desired value.

Thus, if the controller 38 responds because the maximum tensioning force is exceeded then firstly in the summation stage 22 by the output signal of the controller 38 the output signal of said summation stage 22 is reduced, i.e. the travel motion of the hydraulic cylinders 7, 7' is reversed to bring the tensioning roll 4 back and thus reduce the tensioning force. Furthermore, the output signal of the controller 38 drives the limiter stage 29 and the rising ramp of the desired value signal is flattened, i.e. the position desired value is no longer increased in the ramp former.

I claim:

1. Arrangement for controlling the travel of two hydraulic cylinders which are provided for adjusting the position of different portions of the same component, each cylinder having associated with it a respective directional control valve for connecting the respective hydraulic cylinder to a fluid source or a tank, a position pickup for measuring the travel of the component portion and a position controller for generating an error quantity from the measured position and a desired position signal for driving the directional control valves, characterized in that for each hydraulic cylinder a position controller is provided, and means for supplying to both position controllers the same desired value and a correction value is generated in dependence upon the adjustment of the component as actual value and is added to the desired position signal or subtracted from the desired position signal.

2. Arrangement according to claim 1, characterized in that a position pickup is provided for the measurement of the adjustment of the component and each position controller comprises on the input side a summation stage one of which receives in addition to the desired value for the position the measured value of the position pickup directly and the other in addition to the desired value of the position the inverted actual value of the position pickup.

3. Arrangement according to claim 2, characterized in that when a predetermined adjusting force is exceeded the correction value for the positioning of the band is applied to the summation stages for the position desired value.

4. Arrangement according to claim 3, characterized in that the correction value on application to the summation stages on starting up the system is gradually increased until the measured end value is reached.

5. Arrangement according to claim 1, characterized in that at least one measured value pickup, is provided for measuring the adjusting force exerted by the hydraulic cylinders and when a predetermined adjusting force is exceeded the desired value for the position is stopped or reduced.

6. Arrangement according to claim 5, characterized in that for mixing the actual value of the adjusting force with the desired value for the position a further summation stage is provided.

7. Arrangement according to claim 6, characterized in that the steepness of the ramp for the desired value of the position is variable in dependence upon the adjusting force.

8. Arrangement according to claim 7, characterized in that on exceeding the predetermined adjusting force the rising ramp for the desired value of the position is flattened.

9. Arrangement according to claim 1 characterized in that the desired value for the position is predetermined as sliding desired value which can be supplied by an adjusting means via a ramp former to the position controllers the desired value for the position being set so high that the predetermined adjusting force at the component is exceeded before reaching the corresponding position of the component.

10. Arrangement according to claim 9, characterized in that the ramp former consists of an input member with jump function, a limiter stage and an integrating stage the input member comprising an input each for the position desired value and the output signal of the integrating stage and the input member furnishing on a difference of the two signals a voltage which is reduced in the following limiter stage in dependence upon a control voltage applied to the limiter stage and supplied to the integrating stage, the output signal of which has a steepness proportional to the control voltage.

11. Arrangement according to claim 1 characterized in that as adjusting force the difference value of the pressures in the two cylinder chambers of each hydraulic cylinder is determined and the two values are added together.

12. Arrangement according to claim 9, characterized in that a controller is provided to which a signal corresponding to the maximum adjusting force and the actual value of the adjusting force exerted on the component are supplied and that the output of the controller is connected to the limiter stage of the ramp former and the second input of a summation stage, to the first input of which the output of the ramp former is applied.

* * * * *